US011526677B2

(12) United States Patent
Ponomarev

(10) Patent No.: US 11,526,677 B2
(45) Date of Patent: Dec. 13, 2022

(54) SEMANTIC GRAPH EMBEDDING

(71) Applicant: Raytheon BBN Technologies Corp., Cambridge, MA (US)

(72) Inventor: Stanislav Olegovich Ponomarev, Malden, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 255 days.

(21) Appl. No.: 16/939,915

(22) Filed: Jul. 27, 2020

(65) Prior Publication Data
US 2021/0042471 A1 Feb. 11, 2021

Related U.S. Application Data

(60) Provisional application No. 62/882,804, filed on Aug. 5, 2019.

(51) Int. Cl.
*G06F 17/00* (2019.01)
*G06F 40/30* (2020.01)

(52) U.S. Cl.
CPC .................................. *G06F 40/30* (2020.01)

(58) Field of Classification Search
None
See application file for complete search history.

(56) References Cited

U.S. PATENT DOCUMENTS 7,743,062 B2 * 6/2010 Perrone ................. G06F 16/334
707/748
9,190,026 B2 * 11/2015 Yang ..................... G06K 9/6219
10,303,790 B2 5/2019 Bishop et al.

OTHER PUBLICATIONS

Mikolov, Tomas, et al., "Distributed Representations of Words and Phrases and Their Compositionality", Advances in Neural Information Processing Systems, 2013, 9 pgs.

* cited by examiner

*Primary Examiner* — Satwant K Singh
(74) *Attorney, Agent, or Firm* — Schwegman Lundberg & Woessner, P.A.

(57) ABSTRACT

Systems and method herein describe embedding graphs into a semantic multidimensional space by receiving a dataset, constructing a Markov chain from the dataset, the Markov chain comprising a plurality of nodes selecting a basis node and a target node from the plurality of nodes, determining a distance from the target node to the basis node, storing the distance between the target node and the basis node in a vector, analyzing the vector, and determining a semantic characteristic of the target node based on the analysis of the vector.

20 Claims, 5 Drawing Sheets

SEMANTIC GRAPH EMBEDDING

CROSS-REFERENCE TO RELATED APPLICATION

This patent application claims the benefit of U.S. Provisional Patent Application No. 62/882,804, filed Aug. 5, 2019, titled "SEMANTIC GRAPH EMBEDDING", which is incorporated by reference herein in its entirety.

TECHNICAL FIELD

Embodiments of the present disclosure relate generally to semantic graph embedding. More particularly, but not by way of limitation, the present disclosure addresses systems and methods for embedding graphs into a semantic multi-dimensional space.

BACKGROUND

Semantic embedding involves techniques used in natural language processing where words or phrases from vocabulary are represented as vectors of real number. Methods to generate this mapping include machine-learning techniques.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The present disclosure addresses development of a continuous semantic space using Markov chains and graph length embedding. In addition to constructing a continuous semantic space, the proposed method further involves postulating semantic questions by computing arithmetic operations in the semantic space.

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A semantic graph embedding system may generate a continuous semantic space from discrete examples of data. The semantic graph embedding system may further understanding the semantics of the dataset. For examples, the semantic graph embedding system may extract an understanding of how the data within the dataset is being used in a particular context. The semantic graph embedding system may extract the meaning of data in the dataset when the data is used in one particular context versus another context. In some examples, the semantic graph embedding system may compute mathematical manipulations of the dataset. Further details regarding a semantic graph embedding system are described in the paragraphs below.

Figure 1:
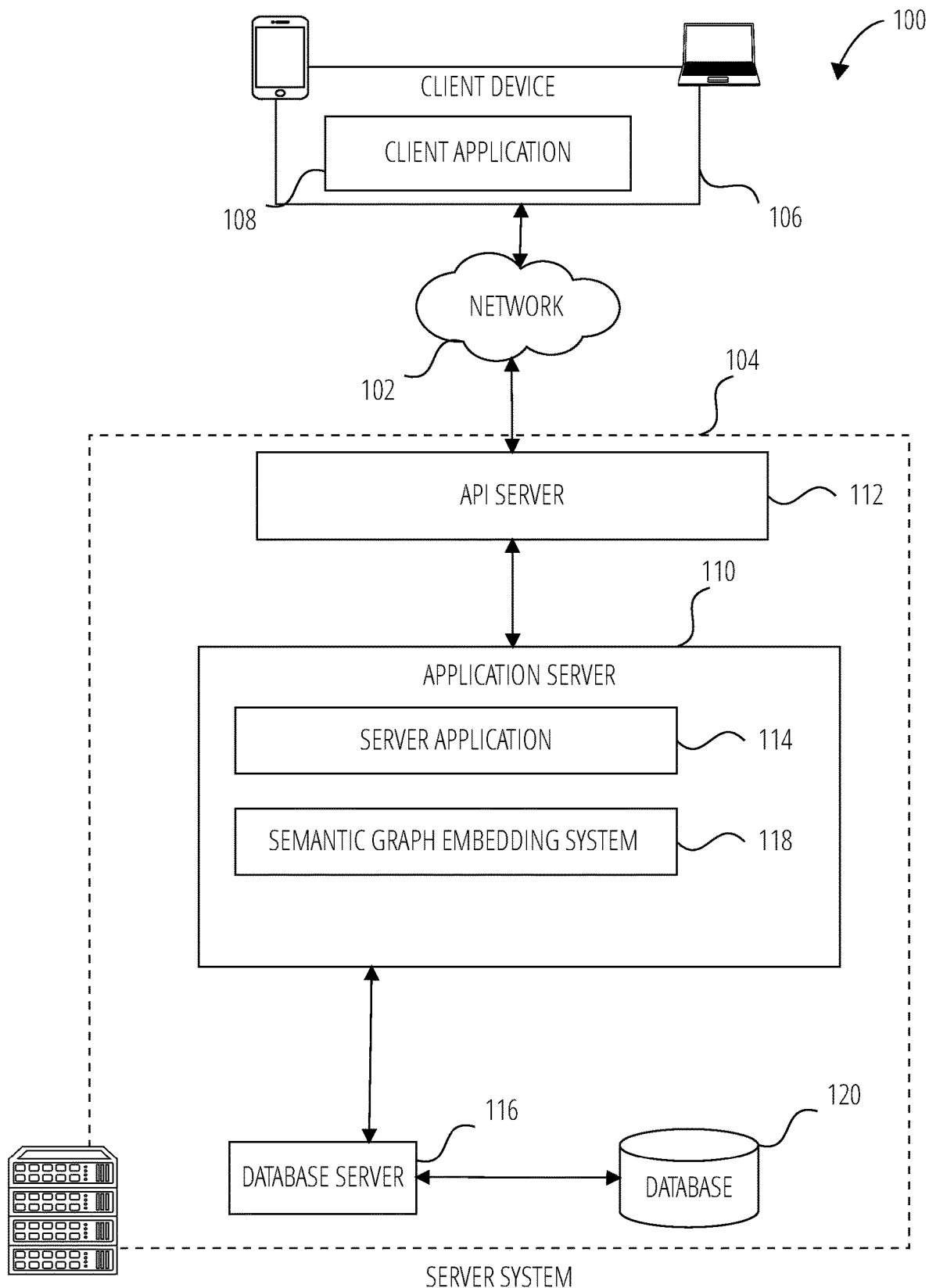
FIG. 1 is a diagrammatic representation of a networked environment in which the present disclosure may be deployed, in accordance with some example embodiments.

FIG. 1 is a block diagram showing an example system 100 for exchanging data (e.g., messages and associated content) over a network. The system 100 includes multiple instances of a client device 102, each of which hosts a number of applications including a client application 104. Each client application 104 is communicatively coupled to other instances of the client application 104 and a server system 108 via a network 106 (e.g., the Internet).

A client application 104 is able to communicate and exchange data with another client application 104 and with the server system 108 via the network 106. The data exchanged between client application 104, and between a client application 104 and the server system 108, includes functions (e.g., commands to invoke functions) as well as payload data (e.g., text, audio, video or other multimedia data).

The server system 108 provides server-side functionality via the network 106 to a particular client application 104. While certain functions of the system 100 are described herein as being performed by either a client application 104 or by the server system 108, the location of certain functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 supports various services and operations that are provided to the client application 104. Such operations include transmitting data to, receiving data from, and processing data generated by the client application 104. This data may include, message content, client device information, geolocation information, as examples. Data exchanges within the system 100 are invoked and controlled through functions available via user interfaces (UIs) of the client application 104.

Turning now specifically to the server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the client application 104 in order to invoke functionality of the application server 112. The Application Program Interface (API) server 110 exposes various functions supported by the application server 112.

The application server 112 hosts a number of applications and subsystems, including a server application 114, a semantic graph embedding system 116.

The server application 114 implements a number of data processing technologies and functions. Other processor and memory intensive processing of data may also be performed server-side by the server application 114, in view of the hardware requirements for such processing.

The semantic graph embedding system 116 supports various data processing services and makes these functions and services available to the server application 114. To this end, the semantic graph embedding system 116 maintains and accesses a graph within the database 120. Examples of functions and services supported by the semantic graph embedding system 116 include generating a semantic space of discrete data points and understanding the semantics of the dataset by performing mathematical manipulations of the data.

The application server 112 is communicatively coupled to a database server 118, which facilitates access to a database 120 in which is stored data associated with messages processed by the server application 114.

Figure 2:
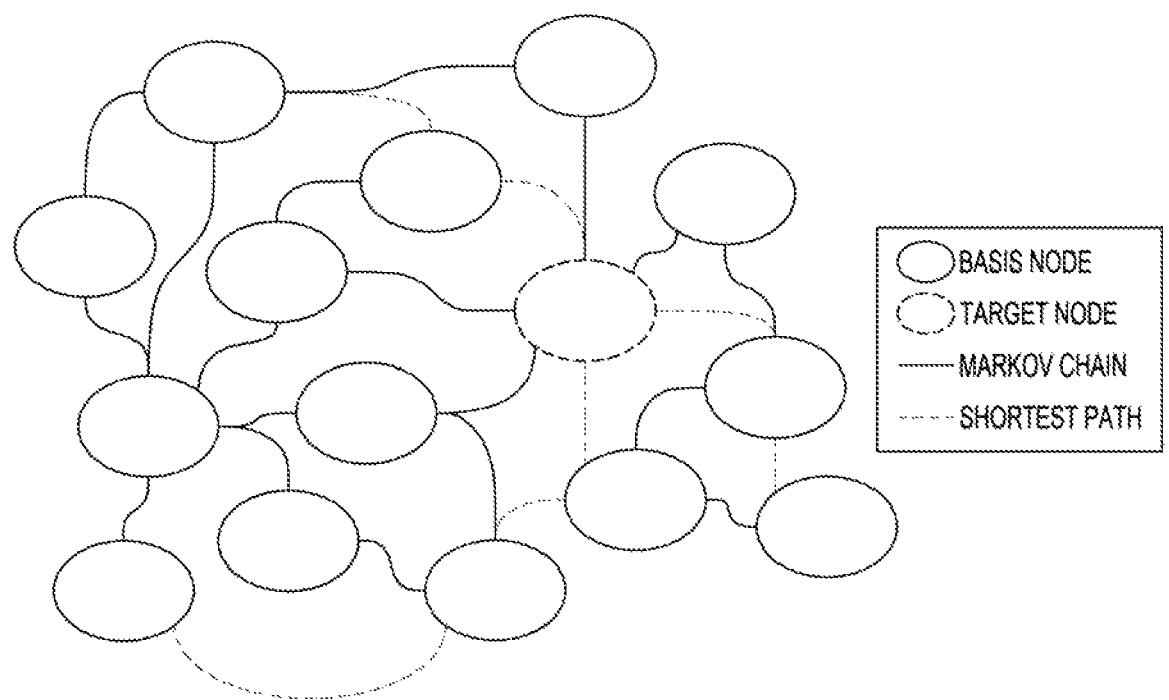
FIG. 2 is an illustration of a Markov chain generated by a semantic graph embedding system, according to some example embodiments.

FIG. 2 is an illustration of a Markov chain as generated by the semantic graph embedding system 116 according to some example embodiments.

In some examples, each node in the Markov chain represents a discrete data value in a dataset. For example, the Markov chain may represent which data values in a given dataset follow other data values in the dataset and the probability that certain data values follow other data values. In one example embodiment, the data value may comprise text (e.g., a word). In one example embodiment, the data value may comprise pixel data (e.g., red, green, blue color values).

The links between each node may be defined as an "edge." An edge may represent a relationship between nodes. In one example, an edge is specified by whether or not a relationship exists between two nodes. In one example, an edge is specified using a thickness scale based on how often the combination of the two nodes appear in a dataset.

In some examples, the semantic graph embedding system 116 selects at least one basis node within the Markov chain. For example, every node in the Markov chain may be a basis node. In some examples, selection of the basis nodes may impact accuracy of the semantic graph embedding system 116.

The semantic graph embedding system 116 may compute a distance (e.g., path cost) between a basis node and a target node. A target node may be identified by the semantic graph embedding system 116. In some examples the distance may be calculated using an algorithm for computing a shortest path between nodes in a graph. For example, the distance may be calculated using Dijkstra's algorithm.

The semantic graph embedding system 116 may store the distances from each target node to all basis nodes in the Markov chain in a vector. The vectors for each target node in the Markov chain may be stored in one or more database 120.

In some examples a new data value may not exist in the Markov chain. In such cases the semantic graph embedding system 116 may augment the existing Markov chain by creating a new node representing the new data value and constructing edges between the new node and existing nodes in the Markov chain. In some examples, a data value may have multiple different meanings (e.g., semantics) based on a particular context. The semantic graph embedding system 116 may resolve such ambiguities by representing each different meaning as a unique node in the Markov chain. For example, the word "code" in a programming context has a different meaning than the word "code" in an encryption context. In that instance, the semantic graph embedding system 116 may represent each definition of the word "code" as two different nodes.

Figure 3:
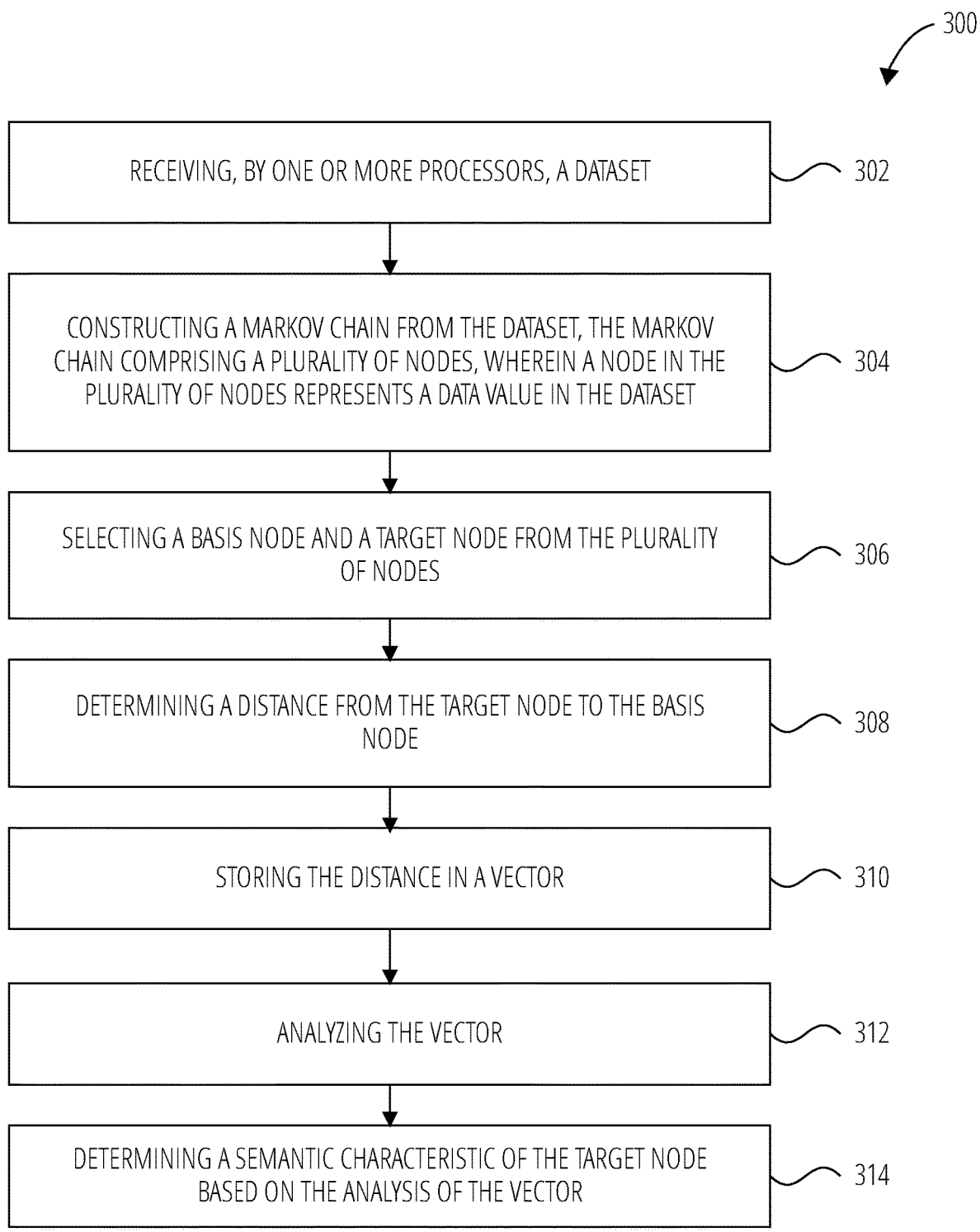
FIG. 3 is a flowchart depicting a method of generating a semantic space, according to some example embodiments.

FIG. 3 is a flowchart depicting a method 300 of generating a semantic space, according to some example embodiments.

At operation 302, the semantic graph embedding system 116 receives a dataset. In some examples, the dataset may comprise a corpus of words (e.g., a book). In some examples, the dataset may comprise one or more images.

At operation 304, the semantic graph embedding system 116 constructs a Markov chain. The Markov chain comprises a plurality of nodes. Each node in the plurality of nodes represents a data value in the dataset. In one example, the dataset is a text sample. The text sample comprises a first word followed by a second word. The semantic graph embedding system 116 constructs a Markov chain which comprises a first node representing the first word, followed by a second node representing a second word. The edge connecting the first node to the second node further indicates a count representing the number of times that the first word is followed by the second word in the text sample. For example, the thickness of the edge increases as the probability that the first word is followed by the second word in the text sample, increase. In another example, each node may represent a pixel in an image (e.g., the dataset).

At operation 306, the semantic graph embedding system 116 selects a basis node and a target node from the plurality of nodes. In some examples, the semantic graph embedding system 116 selects multiple basis nodes and one target node. For example, all nodes in the plurality of nodes may be a basis node, except for the target node. Further details regarding the basis node and the target node are described above in relation to FIG. 2.

At operation 308, the semantic graph embedding system 116 determines a distance (e.g., a path cost) from the target node to the basis node. For example, the semantic graph embedding system 116 may construct a Markov chain for the sentence, "I ate apples today." Each word in the sentence may be represented by a node in the Markov chain. If the node, "I" is a target node, and the node "today" is a basis node, the path cost from the target node to the basis node may represent the cost to construct a sentence from the target node to the basis node.

At operation 310, the distance (e.g., path cost) determined in operation 308 is stored as a dimension in a vector. For example, if the Markov chain consists of 5 basis nodes, then the vector representation of the target node would be: [A,B,C,D,E], where each of A, B, C, D, and E is the distance from the target node to a respective basis node. In some examples, the semantic graph embedding system 116 reduces the vector (e.g., an n-dimensional vector) to a three-dimensional vector using principal component analysis (PCA).

At operation 312, the semantic graph embedding system 116 analyzes the vector representation of the target node. The semantic graph embedding system 116 may receive a query from a client device (e.g., client device 102). The query comprises arithmetic operations to be applied to the vector. In some examples, the operations to be applied on the vector may involve natural language processing. In some examples, the operations to be applied on the vector may involve image processing.

At operation 314, the semantic graph embedding system 116 determines a semantic characteristic of the target node based on the analysis of the vector. In the case of a natural language processing analysis, the semantic characteristic of the target node may involve identifying relations between words (e.g., determining search terms for a search engine). In an example involving image processing, the semantic characteristic of the target node may involve object recognition within an image.

The semantic graph embedding system 116 may receive a new data value for addition into the dataset. The new data value is added to the Markov chain. For example, the semantic graph embedding system 116 generates a new node representing the new data value and extends the existing Markov chain by integrating the new node. The new node is further connected via edges to pre-existing nodes based on the relationship between the new node and the pre-existing nodes.

Figure 4:
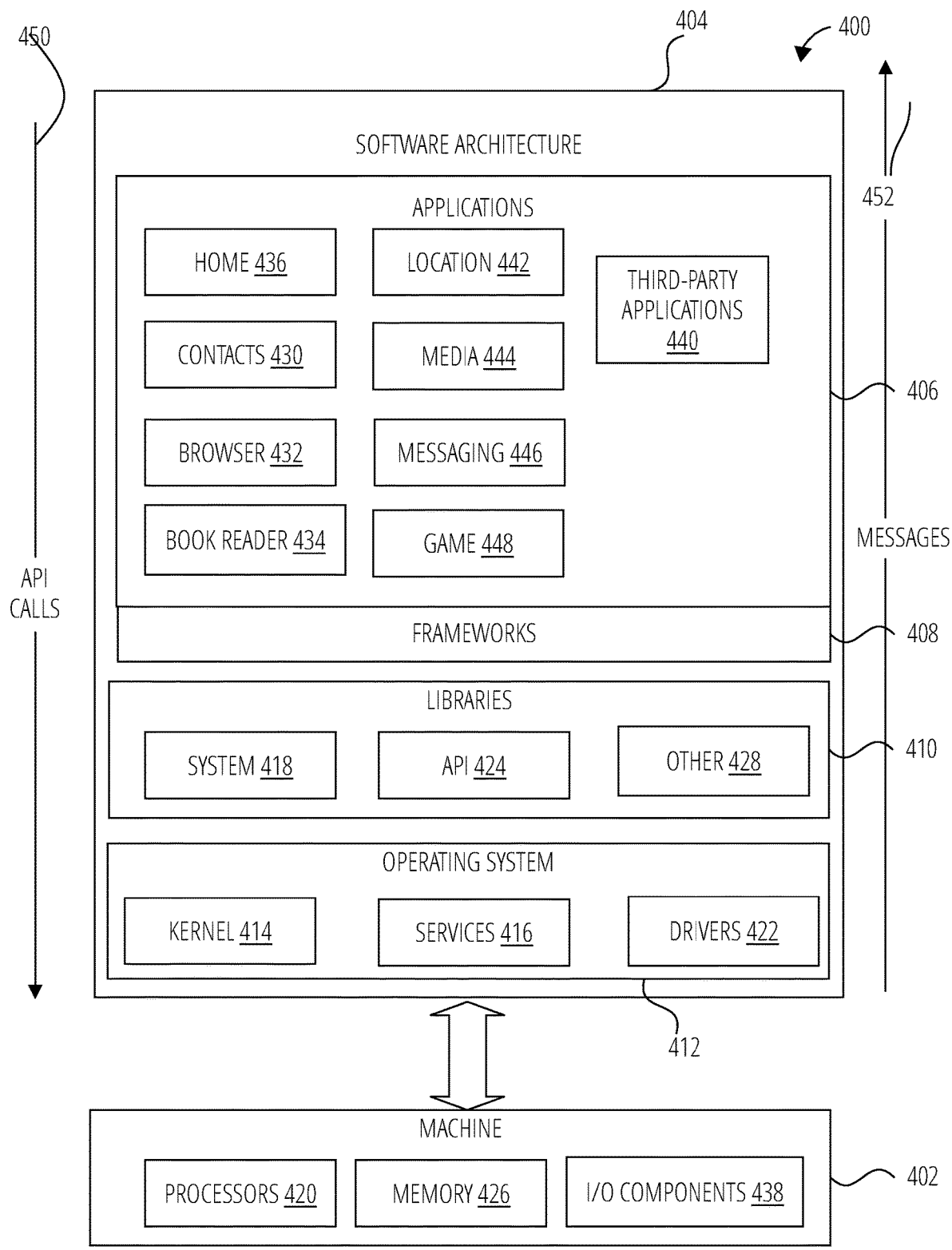
FIG. 4 is block diagram showing a software architecture within which the present disclosure may be implemented, in accordance with some example embodiments.

FIG. 4 is a block diagram 400 illustrating a software architecture 404, which can be installed on any one or more of the devices described herein. The software architecture 404 is supported by hardware such as a machine 402 that includes processors 420, memory 426, and I/O components 438. In this example, the software architecture 404 can be conceptualized as a stack of layers, where each layer provides a particular functionality. The software architecture 404 includes layers such as an operating system 412, libraries 410, frameworks 408, and applications 406. Operationally, the applications 406 invoke API calls 450 through the software stack and receive messages 452 in response to the API calls 450.

The operating system 412 manages hardware resources and provides common services. The operating system 412 includes, for example, a kernel 414, services 416, and drivers 422. The kernel 414 acts as an abstraction layer between the hardware and the other software layers. For example, the kernel 414 provides memory management, processor management (e.g., scheduling), component management, networking, and security settings, among other functionality. The services 416 can provide other common services for the other software layers. The drivers 422 are responsible for controlling or interfacing with the underlying hardware. For instance, the drivers 422 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 410 provide a low-level common infrastructure used by the applications 406. The libraries 410 can include system libraries 418 (e.g., C standard library) that provide functions such as memory allocation functions, string manipulation functions, mathematic functions, and the like. In addition, the libraries 410 can include API libraries 424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 410 can also include a wide variety of other libraries 428 to provide many other APIs to the applications 406.

The frameworks 408 provide a high-level common infrastructure that is used by the applications 406. For example, the frameworks 408 provide various graphical user interface (GUI) functions, high-level resource management, and high-level location services. The frameworks 408 can provide a broad spectrum of other APIs that can be used by the applications 406, some of which may be specific to a particular operating system or platform.

In an example embodiment, the applications 406 may include a home application 436, a contacts application 430, a browser application 432, a book reader application 434, a location application 442, a media application 444, a messaging application 446, a game application 448, and a broad assortment of other applications such as third-party applications 440. The applications 406 are programs that execute functions defined in the programs. Various programming languages can be employed to create one or more of the applications 406, structured in a variety of manners, such as object-oriented programming languages (e.g., Objective-C, Java, or C++) or procedural programming languages (e.g., C or assembly language). In a specific example, the third-party applications 440 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 440 can invoke the API calls 450 provided by the operating system 412 to facilitate functionality described herein.

Figure 5:
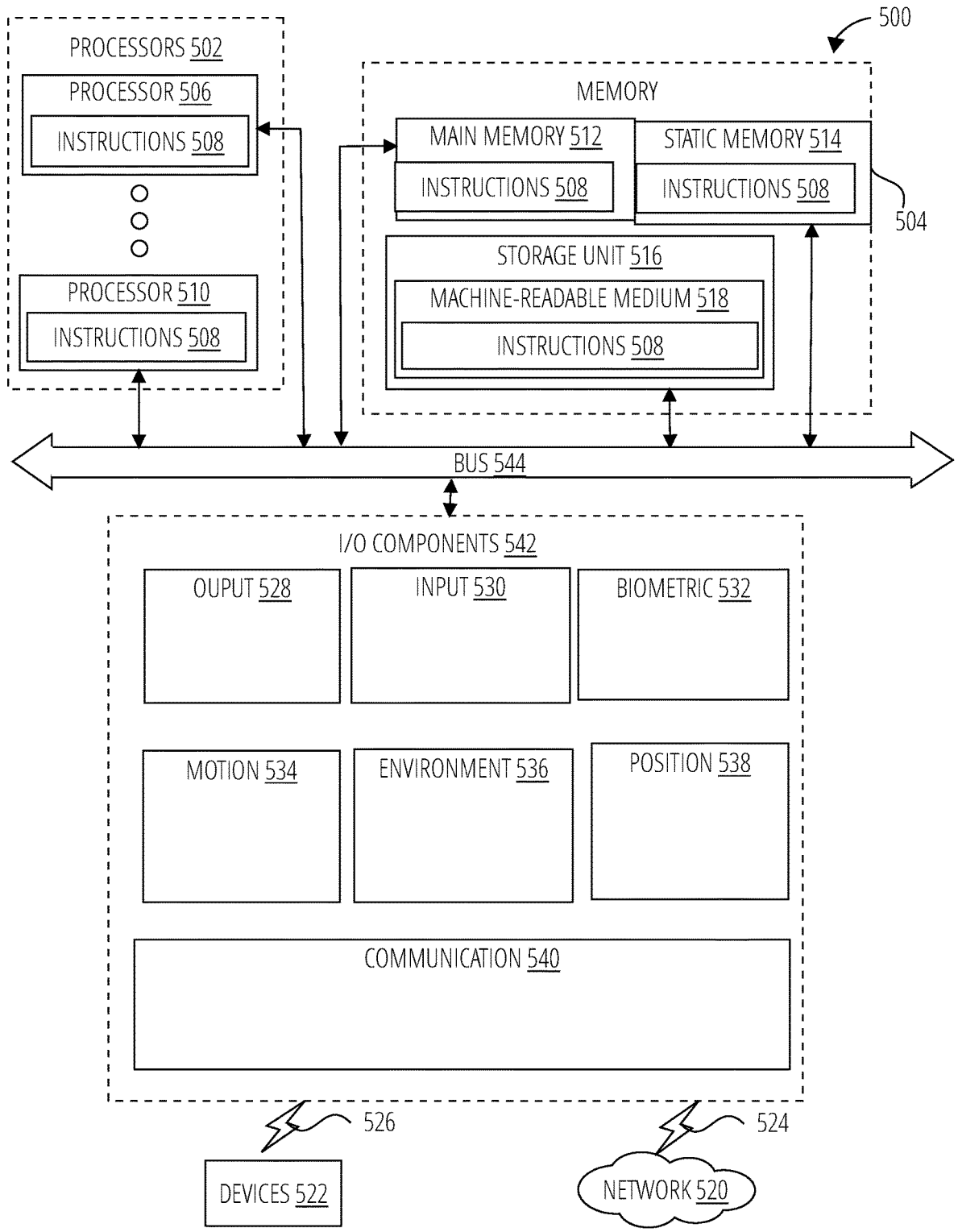
FIG. 5 is a diagrammatic representation of a machine, in the form of a computer system within which a set of instructions may be executed for causing the machine to perform any one or more of the methodologies discussed, in accordance with some example embodiments.

FIG. 5 is a diagrammatic representation of a machine 500 within which instructions 508 (e.g., software, a program, an application, an applet, an app, or other executable code) for causing the machine 500 to perform any one or more of the methodologies discussed herein may be executed. For example, the instructions 508 may cause the machine 500 to execute any one or more of the methods described herein. The instructions 508 transform the general, non-programmed machine 500 into a particular machine 500 programmed to carry out the described and illustrated functions in the manner described.

The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 508, sequentially or otherwise, that specify actions to be taken by the machine 500. Further, while only a single machine 500 is illustrated, the term "machine" shall also be taken to include a collection of machines that individually or jointly execute the instructions 508 to perform any one or more of the methodologies discussed herein.

The machine 500 may include processors 502, memory 504, and I/O components 542, which may be configured to communicate with each other via a bus 544. In an example embodiment, the processors 502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 506 and a processor 510 that execute the instructions 508. The term "processor" is intended to include multi-core processors that may comprise two or more independent processors (sometimes referred to as "cores") that may execute instructions contemporaneously. Although FIG. 5 shows multiple processors 502, the machine 500 may include a single processor with a single core, a single processor with multiple cores (e.g., a multi-core processor), multiple processors with a single core, multiple processors with multiples cores, or any combination thereof.

The memory 504 includes a main memory 512, a static memory 514, and a storage unit 516, both accessible to the processors 502 via the bus 544. The main memory 504, the static memory 514, and storage unit 516 store the instructions 508 embodying any one or more of the methodologies or functions described herein. The instructions 508 may also reside, completely or partially, within the main memory 512, within the static memory 514, within machine-readable medium 518 (e.g., machine-readable storage medium) within the storage unit 516, within at least one of the processors 502 (e.g., within the processor's cache memory), or any suitable combination thereof, during execution thereof by the machine 500.

The I/O components 542 may include a wide variety of components to receive input, provide output, produce output, transmit information, exchange information, capture measurements, and so on. The specific I/O components 542 that are included in a particular machine will depend on the type of machine. For example, portable machines such as mobile phones may include a touch input device or other such input mechanisms, while a headless server machine will likely not include such a touch input device. It will be appreciated that the I/O components 542 may include many other components that are not shown in FIG. 5. In various example embodiments, the I/O components 542 may include output components 528 and input components 530. The output components 528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 542 may include biometric components 532, motion components 534, environmental components 536, or position components 538, among a wide array of other components. For example, the biometric components 532 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 534 include acceleration sensor components (e.g., accelerometer), gravitation sensor components, rotation sensor components (e.g., gyroscope), and so forth. The environmental components 536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 538 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 542 further include communication components 540 operable to couple the machine 500 to a network 520 or devices 522 via a coupling 524 and a coupling 526, respectively. For example, the communication components 540 may include a network interface component or another suitable device to interface with the network 520. In further examples, the communication components 540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 522 may be another machine or any of a wide variety of peripheral devices (e.g., a peripheral device coupled via a USB).

Moreover, the communication components 540 may detect identifiers or include components operable to detect identifiers. For example, the communication components 540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540, such as location via Internet Protocol (IP) geolocation, location via Wi-Fi® signal triangulation, location via detecting an NFC beacon signal that may indicate a particular location, and so forth.

The various memories (e.g., memory 504, main memory 512, static memory 514, and/or memory of the processors 502) and/or storage unit 516 may store one or more sets of instructions and data structures (e.g., software) embodying or used by any one or more of the methodologies or functions described herein. These instructions (e.g., the instructions 508), when executed by processors 502, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 520 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1116, or a portion of the network 1116 may include a wireless or cellular network, and the coupling 1120 may be a Code Division Multiple Access (CDMA) connection, a Global System for Mobile communications (GSM) connection, or another type of cellular or wireless coupling. In this example, the coupling 524 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 508 may be transmitted or received over the network 520, using a transmission medium, via a network interface device (e.g., a network interface component included in the communication components 540) and using any one of a number of well-known transfer protocols (e.g., hypertext transfer protocol (HTTP)). Similarly, the instructions 508 may be transmitted or received using a transmission medium via the coupling 526 (e.g., a peer-to-peer coupling) to the devices 522.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals. "Non-transitory computer-readable storage medium" refers to a tangible medium that is capable of storing, encoding, or carrying the instructions for execution by a machine.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, by one or more processors, a dataset;
constructing a Markov chain from the dataset, the Markov chain comprising a plurality of nodes, wherein a node in the plurality of nodes represents a data value in the dataset;
selecting, a basis node and a target node from the plurality of nodes;

determining a distance from the target node to the basis node;

storing the distance between the target node and the basis node in a vector;

analyzing the vector including applying arithmetic operations to the vector, the arithmetic operations comprising at least one of natural language processing analysis and image processing analysis; and determining a semantic characteristic of the target node based on the analysis of the vector, wherein for the natural language processing analysis, determining the semantic characteristic comprises identifying relations between words, and wherein for the image processing analysis, determining the semantic characteristic comprises performing object recognition within an image.

2. The method of claim 1, wherein the selecting the basis node and the target node further comprises:

selecting a second basis node from the plurality of nodes;
determining a second distance from the target node to the second basis node; and
storing the second distance in the vector.

3. The method of claim 1, wherein each dimension of the vector is the distance from the target node to the basis node.

4. The method of claim 3, further comprising:
reducing the vector to a three-dimensional vector.

5. The method of claim 1, further comprising:
receiving a new data value for addition into the dataset; and
extending the Markov chain for the dataset, the extension comprising generating a new node representing the new data value.

6. The method of claim 1, wherein analyzing the vector further comprises:
receiving a query from a client device, the query comprising arithmetic operations to be applied to the vector.

7. A method comprising:
receiving, by one or more processors, a dataset, wherein the dataset is a text sample comprising a first word and a second word;
constructing a Markov chain from the dataset, the Markov chain comprising a plurality of nodes, wherein a node in the plurality of nodes represents a data value in the dataset;
selecting a basis node and a target node from the plurality of nodes;
determining a distance from the target node to the basis node;
storing the distance between the target node and the basis node in a vector;
analyzing the vector;
determining a semantic characteristic of the target node based on the analysis of the vector;
determining a count representing a number of times that the first word is followed by the second word in the text sample; and
constructing the Markov chain from the text sample, wherein the first word is a first node, and the second word is a second node.

8. A system comprising:
a processor; and
a memory storing instructions that, when executed by the processor, cause the system to perform operations comprising:
receiving, by one or more processors, a dataset;
constructing a Markov chain from the dataset, the Markov chain comprising a plurality of nodes, wherein a node in the plurality of nodes represents a data value in the dataset;

selecting, a basis node and a target node from the plurality of nodes;

determining a distance from the target node to the basis node;

storing the distance between the target node and the basis node in a vector;

analyzing the vector including applying arithmetic operations to the vector, the arithmetic operations comprising at least one of natural language processing analysis and image processing analysis; and determining a semantic characteristic of the target node based on the analysis of the vector, wherein for the natural language processing analysis, determining the semantic characteristic comprises identifying relations between words, and wherein for the image processing analysis, determining the semantic characteristic comprises object recognition within an image.

9. The system of claim 8, wherein the selecting the basis node and the target node further comprises:
selecting a second basis node from the plurality of nodes;
determining a second distance from the target node to the second basis node; and
storing the second distance in the vector.

10. The system of claim 8, wherein each dimension of the vector is the distance from the target node to the basis node.

11. The system of claim 10, further comprising:
reducing the vector to a three-dimensional vector.

12. The system of claim 8, further comprising:
receiving a new data value for addition into the dataset; and
extending the Markov chain for the dataset, the extension comprising generating a new node representing the new data value.

13. The system of claim 8, wherein analyzing the vector further comprises:
receiving a query from a client device, the query comprising arithmetic operations to be applied to the vector.

14. A system comprising:
a processor; and
a memory storing instructions that, when executed the processor, cause the system to perform operations comprising:
receiving, one or more processors, a dataset, wherein the dataset is a text sample comprising a first word and a second word;
constructing a Markov chain from the dataset, the Markov chain comprising a plurality of nodes, wherein a node in the plurality of nodes represents a data value in the dataset;
selecting a basis node and a target node from the plurality of nodes;
determining a distance from the target node to the basis node;
storing the distance between the target node and the basis node in a vector;
analyzing the vector;
determining a semantic characteristic of the target node based on the analysis of the vector;
determining a count representing a number of times that the first word is followed by the second word in the text sample; and constructing the Markov chain from the text sample, wherein the first word is a first node, and the second word is a second node.

15. A non-transitory computer-readable storage medium, the computer-readable storage medium including instructions that when executed by a computer, cause the computer to perform operations comprising:
  receiving, by one or more processors, a dataset;
  constructing a Markov chain from the dataset, the Markov chain comprising a plurality of nodes, wherein a node in the plurality of nodes represents a data value in the dataset;
  selecting, a basis node and a target node from the plurality of nodes;
  determining a distance from the target node to the basis node;
  storing the distance between the target node and the basis node in a vector;
  analyzing the vector including applying arithmetic operations to the vector, the arithmetic operations comprising at least one of natural language processing analysis and image processing analysis; and
  determining a semantic characteristic of the target node based on the analysis of the vector,
  wherein for the natural language processing analysis, determining the semantic characteristic comprises identifying relations between words, and
  wherein for the image processing analysis, determining the semantic characteristic comprises object recognition within an imam.

16. The computer-readable storage medium of claim 15, wherein the selecting the basis node and the target node further comprises:
  selecting a second basis node from the plurality of nodes;
  determining a second distance from the target node to the second basis node; and
  storing the second distance in the vector.

17. The computer-readable storage medium of claim 15, wherein each dimension of the vector is the distance from the target node to the basis node.

18. The computer-readable storage medium of claim 17, further comprising:
  reducing the vector to a three-dimensional vector.

19. The computer-readable storage medium of claim 15, further comprising:
  receiving a new data value for addition into the dataset; and
  extending the Markov chain for the dataset, the extension comprising generating a new node representing the new data value.

20. A non-transitory computer-readable storage medium, the computer-readable storage medium including instructions that when executed by a computer, cause the computer to perform operations comprising:
  receiving, by one or more processors, a dataset, wherein the dataset is a text sample comprising a first word and a second word;
  constructing a Markov chain from the dataset, the Markov chain comprising a plurality of nodes, wherein a node in the plurality of nodes represents a data value in the dataset;
  selecting, a basis node and a target node from the plurality of nodes;
  determining a distance from the target node to the basis node;
  storing the distance between the target node and the basis node in a vector;
  analyzing the vector;
  determining a semantic characteristic of the target node based on the analysis of the vector;
  determining a count representing a number of times that the first word is followed by the second word in the text sample; and
  constructing the Markov chain from the text sample, wherein the first word is a first node, and the second word is a second node.

* * * * *